United States Patent
Liu et al.

(10) Patent No.: US 11,776,217 B2
(45) Date of Patent: Oct. 3, 2023

(54) METHOD FOR PLANNING THREE-DIMENSIONAL SCANNING VIEWPOINT, DEVICE FOR PLANNING THREE-DIMENSIONAL SCANNING VIEWPOINT, AND COMPUTER READABLE STORAGE MEDIUM

(71) Applicant: SHENZHEN UNIVERSITY, Guangdong (CN)

(72) Inventors: Xiaoli Liu, Guangdong (CN); Yifan Liao, Guangdong (CN); Hailong Chen, Guangdong (CN); Xiang Peng, Guangdong (CN); Qijian Tang, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 93 days.

(21) Appl. No.: 17/431,737

(22) PCT Filed: Jul. 26, 2019

(86) PCT No.: PCT/CN2019/097952
§ 371 (c)(1),
(2) Date: Aug. 18, 2021

(87) PCT Pub. No.: WO2020/168685
PCT Pub. Date: Aug. 27, 2020

(65) Prior Publication Data
US 2022/0139040 A1     May 5, 2022

(30) Foreign Application Priority Data
Feb. 20, 2019   (CN) .......................... 201910125324.0

(51) Int. Cl.
*G06T 19/00*   (2011.01)
*G06T 7/70*    (2017.01)
(Continued)

(52) U.S. Cl.
CPC ............... *G06T 19/00* (2013.01); *G06T 7/70* (2017.01); *G06T 7/85* (2017.01); *G06T 17/00* (2013.01);
(Continued)

(58) Field of Classification Search
None
See application file for complete search history.

(56) References Cited

U.S. PATENT DOCUMENTS

2003/0182011 A1* 9/2003 Scherer ................. B28B 7/0044
                                                        700/197
2017/0053438 A1* 2/2017 Huang ..................... G06T 17/20
(Continued)

OTHER PUBLICATIONS

Martins et al., "Automated 3D surface scanning based on CAD model," Mechatronics 15.7 (2005): 837-857 (Year: 2005).*
(Continued)

*Primary Examiner* — Anh-Tuan V Nguyen
(74) *Attorney, Agent, or Firm* — Li & Cai Intellectual Property (USA) Office

(57) ABSTRACT

Disclosed in the embodiments of the present disclosure are a method for planning three-dimensional scanning viewpoint, a device for planning three-dimensional scanning viewpoint and a computer readable storage medium. After a low-precision digitalized model of an object to be scanned is acquired, viewpoint planning calculation is performed, on the basis of a viewpoint planning algorithm, on point cloud data in the low-precision digitalized model, and then the positions and line-of-sight directions of a plurality of viewpoints in space are calculated when a three-dimensional sensor needs to perform three-dimensional scanning on said object. Calculating viewpoints of a three-dimensional sensor by means of a viewpoint planning algorithm can effectively improve the accuracy and scientific nature of sensor posture determination, greatly improving the efficiency of viewpoint
(Continued)

Acquire a low-precision digitalized model of an object to be scanned, where the low-precision digitalized model is used to indicate spatial information of the object to be scanned — 101

Perform a viewpoint planning calculation on point cloud data in the low-precision digitalized model according to a preset viewpoint planning algorithm — 102 if it is determined that a preset algorithm termination condition is met, determine all calculated viewpoint information as a target viewpoint collection of a three-dimensional sensor during overall scanning of the object to be scanned, where the viewpoint information includes viewpoint position information and viewpoint direction information — 103 planning, and reducing the time consumed in the whole three-dimensional measurement process.

15 Claims, 7 Drawing Sheets

(51) Int. Cl.
*H04N 13/221* (2018.01)
*H04N 13/275* (2018.01)
*H04N 13/282* (2018.01)
*G06T 17/00* (2006.01)
*G06T 7/80* (2017.01)

(52) U.S. Cl.
CPC ......... *H04N 13/221* (2018.05); *H04N 13/275* (2018.05); *H04N 13/282* (2018.05); *G06T 2207/30244* (2013.01); *G06T 2210/12* (2013.01)

(56) References Cited

U.S. PATENT DOCUMENTS

2019/0259202 A1* 8/2019 Taubin .................... G06T 17/00
2020/0001458 A1* 1/2020 Zhang .................... B25J 9/1612

OTHER PUBLICATIONS

Kriegel et al., "Next-best-scan planning for autonomous 3d modeling," 2012 IEEE/RSJ International Conference on Intelligent Robots and Systems (Year: 2012).*

* cited by examiner

METHOD FOR PLANNING THREE-DIMENSIONAL SCANNING VIEWPOINT, DEVICE FOR PLANNING THREE-DIMENSIONAL SCANNING VIEWPOINT, AND COMPUTER READABLE STORAGE MEDIUM

FIELD OF THE DISCLOSURE

The present disclosure relates to the field of computer vision technologies, and more particularly to a method for planning three-dimensional scanning viewpoint and a device for planning three-dimensional scanning viewpoint, and a computer readable storage medium.

BACKGROUND OF THE DISCLOSURE

Among optical measurement methods, binocular stereo vision measurement is widely applied in automotive, aviation, aerospace and other manufacturing fields due to its high measurement accuracy, rapid measurement speed, and good adaptability. A single measurement range of a binocular stereo vision measurement system is a limited range within a public field of view (FOV) of left and right cameras. Therefore, during measurement of a complex part, it is usually required to change a position-posture relationship between the camera and a measured object several times due to the limited FOV of the camera during measurement and the obstruction from the measured object, and complete three-dimensional data of the part can be obtained by multiple measurements and data splicing. At present, the change in position and posture of the camera (also referred to as a sensor) relative to the measured object is implemented usually by a technician manually adjusting the position and posture of the camera. This adjustment manner completely depends on the experience and technical level of the technician. However, the operation behavior of the technician is usually less global and not accurate enough, easily causing problems such as repeated measurement or missed measurement by the camera. Moreover, the manpower efficiency is low, which makes the whole measurement process time-consuming.

SUMMARY OF THE DISCLOSURE

Technical Problem

Embodiments of the present disclosure mainly aim to provide a method for planning three-dimensional scanning viewpoint and a device for planning three-dimensional scanning viewpoint, and a computer readable storage medium, which can at least solve the problem that manual adjustment of the camera position and posture leads to low measurement accuracy and a time-consuming measurement process during three-dimensional scanning of an object in the prior art.

Technical Solutions

To solve the foregoing objective, in one aspect, an embodiment of the present disclosure provides a method for planning three-dimensional scanning viewpoint, which includes:

acquiring a low-precision digitalized model of an object to be scanned, where the low-precision digitalized model is used to indicate spatial information of the object to be scanned;

performing a viewpoint planning calculation on point cloud data in the low-precision digitalized model according to a preset viewpoint planning algorithm; and if it is determined that a preset algorithm termination condition is met, determining all calculated viewpoint information as a target viewpoint set of a three-dimensional sensor during overall scanning of the object to be scanned, where the viewpoint information includes viewpoint position information and viewpoint direction information.

To achieve the foregoing objective, in the second aspect, an embodiment of the present disclosure provides a device for planning three-dimensional scanning viewpoint, which includes:

an acquisition module configured to acquire a low-precision digitalized model of an object to be scanned, where the low-precision digitalized model is used to indicate spatial information of the object to be scanned;

a calculation module configured to perform a viewpoint planning calculation on point cloud data in the low-precision digitalized model according to a preset viewpoint planning algorithm; and a determining module configured to: if it is determined that a preset algorithm termination condition is met, determine all calculated viewpoint information as a target viewpoint set of a three-dimensional sensor during overall scanning of the object to be scanned, where the viewpoint information includes viewpoint position information and viewpoint direction information.

To achieve the foregoing objective, in the third aspect, an embodiment of the present disclosure provides an electronic device, which includes: a processor, a memory, and a communication bus, where the communication bus is configured to realize connection and communication between the processor and the memory; and the processor is configured to execute one or more programs stored in the memory, so as to implement any one of the steps of the foregoing method for planning three-dimensional scanning viewpoint.

To achieve the foregoing objective, in the fourth aspect, an embodiment of the present disclosure provides a computer readable storage medium, which stores one or more programs, where the one or more programs can be executed by one or more processors, so as to implement any one of the steps of the foregoing method for planning three-dimensional scanning viewpoint.

Advantageous Effects

According to the method for planning three-dimensional scanning viewpoint and the device for planning three-dimensional scanning viewpoint, and the computer readable storage medium provided by the embodiments of the present disclosure, after a low-precision digitalized model of an object to be scanned is acquired, viewpoint planning calculation is performed, on the basis of a viewpoint planning algorithm, on point cloud data in the low-precision digitalized model, and then the positions and line-of-sight directions of a plurality of viewpoints in space are calculated when a three-dimensional sensor needs to perform three-dimensional scanning on the object. Calculating viewpoints of a three-dimensional sensor by means of a viewpoint planning algorithm can effectively improve the accuracy and scientific nature of sensor posture determination, greatly improving the efficiency of viewpoint planning, and reducing the time consumed in the whole three-dimensional measurement process.

Other features and corresponding effects of the present disclosure will be explained and described in the latter part of the specification. It should be understood that, at least part of the effects becomes obvious from the description in the specification of the present disclosure.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

DETAILED DESCRIPTION OF THE EXEMPLARY EMBODIMENTS

To make the objective, technical solutions, and advantages of the present disclosure clearer, the technical solutions in the embodiments of the present disclosure are clearly and completely described below with reference to the accompanying drawings in the embodiments of the present disclosure. Apparently, the described embodiments are some rather than all of the embodiments of the present disclosure. Based on the embodiments of the present disclosure, other embodiments acquired by those of ordinary skill in the art without creative effort all belong to the protection scope of the present disclosure.

First Embodiment

Figure 1:
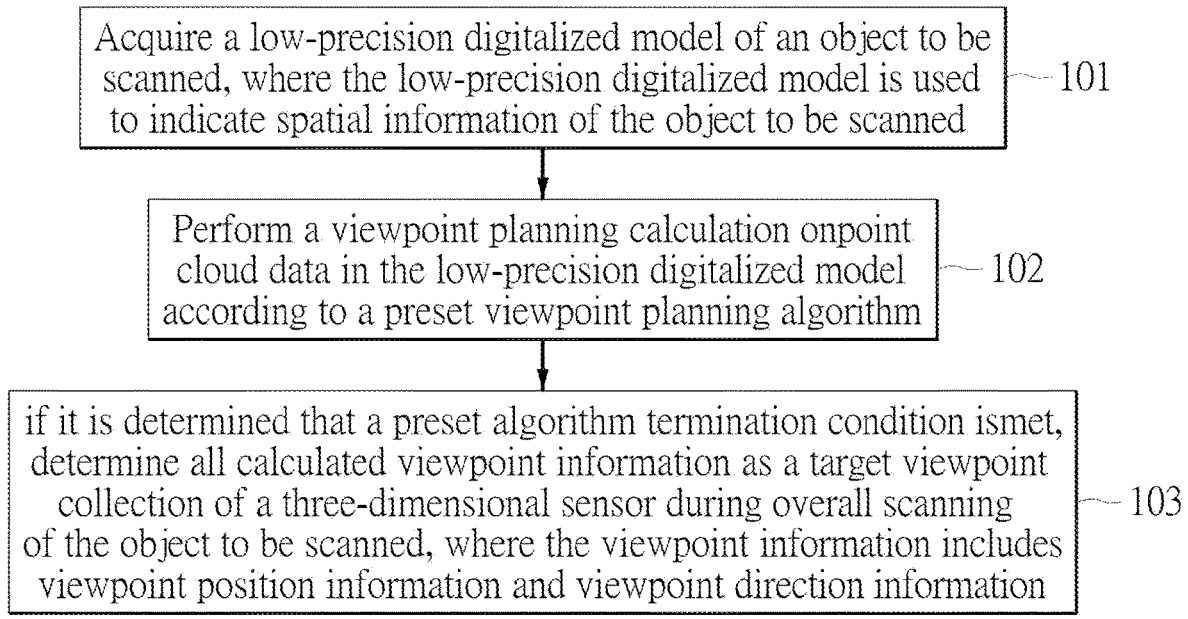
FIG. 1 is a schematic diagram of a basic process of a method for planning three-dimensional scanning viewpoint provided in the first embodiment of the present disclosure.

In order to solve the technical problem that manual adjustment of the camera position and posture leads to low measurement accuracy and a time-consuming measurement process during three-dimensional scanning of an object in the prior art, this embodiment provides a method for planning three-dimensional scanning viewpoint. As shown in FIG. 1, FIG. 1 is a schematic diagram of a basic process of the method for planning three-dimensional scanning viewpoint provided in this embodiment, which includes the following steps:

Step 101: Acquire a low-precision digitalized model of an object to be scanned, where the low-precision digitalized model is used to indicate spatial information of the object to be scanned.

Figure 2:
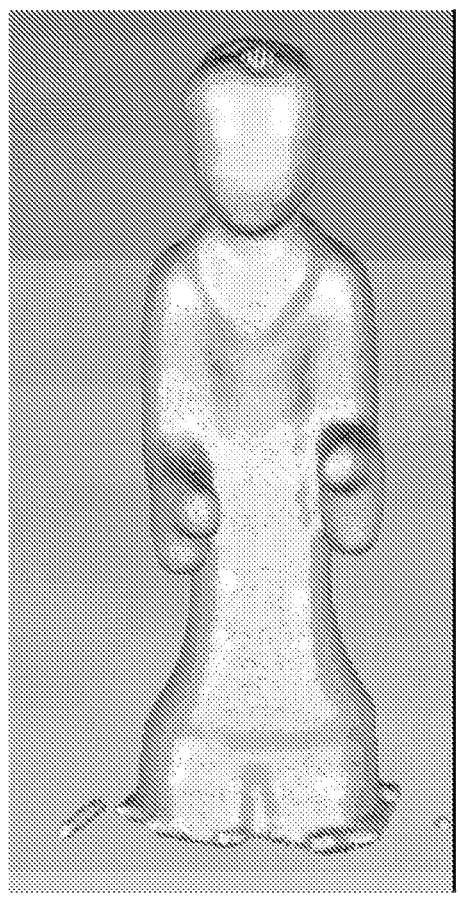
FIG. 2 is a schematic diagram of a low-precision digitalized model provided in the first embodiment of the present disclosure.

Specifically, in this embodiment, the object to be scanned may be a known object or an unknown object, where the known object is an object of which spatial information is known to a system in advance. Then, during viewpoint planning for such an object, a low-precision digitalized model for indicating its spatial information may be directly extracted. For the unknown object, its spatial information is unknown. In an actual application, the objected is scanned by using a depth camera, thus obtaining its low-precision digitalized model. As shown in FIG. 2, FIG. 2 is a schematic diagram of the low-precision digitalized model provided in this embodiment.

In an alternative implementation of this embodiment, after the low-precision digitalized model of the object to be scanned is acquired, the method further includes: performing edge trimming on the low-precision digitalized model.

Specifically, in an actual application, in order to improve the effect and accuracy of the low-precision digitalized model as much as possible, the edge of the model is trimmed in this embodiment. The edge trimming includes: edge repair and stray edge removal, where the edge repair is mending the edge.

Step 102: Perform a viewpoint planning calculation on point cloud data in the low-precision digitalized model according to a preset viewpoint planning algorithm.

Specifically, the point cloud data is a set of point data on the surface of the object. In this embodiment, the viewpoint planning algorithm is executed on the point cloud data to calculate the position and posture of a three-dimensional sensor in space during three-dimensional scanning of the object.

Figure 3:
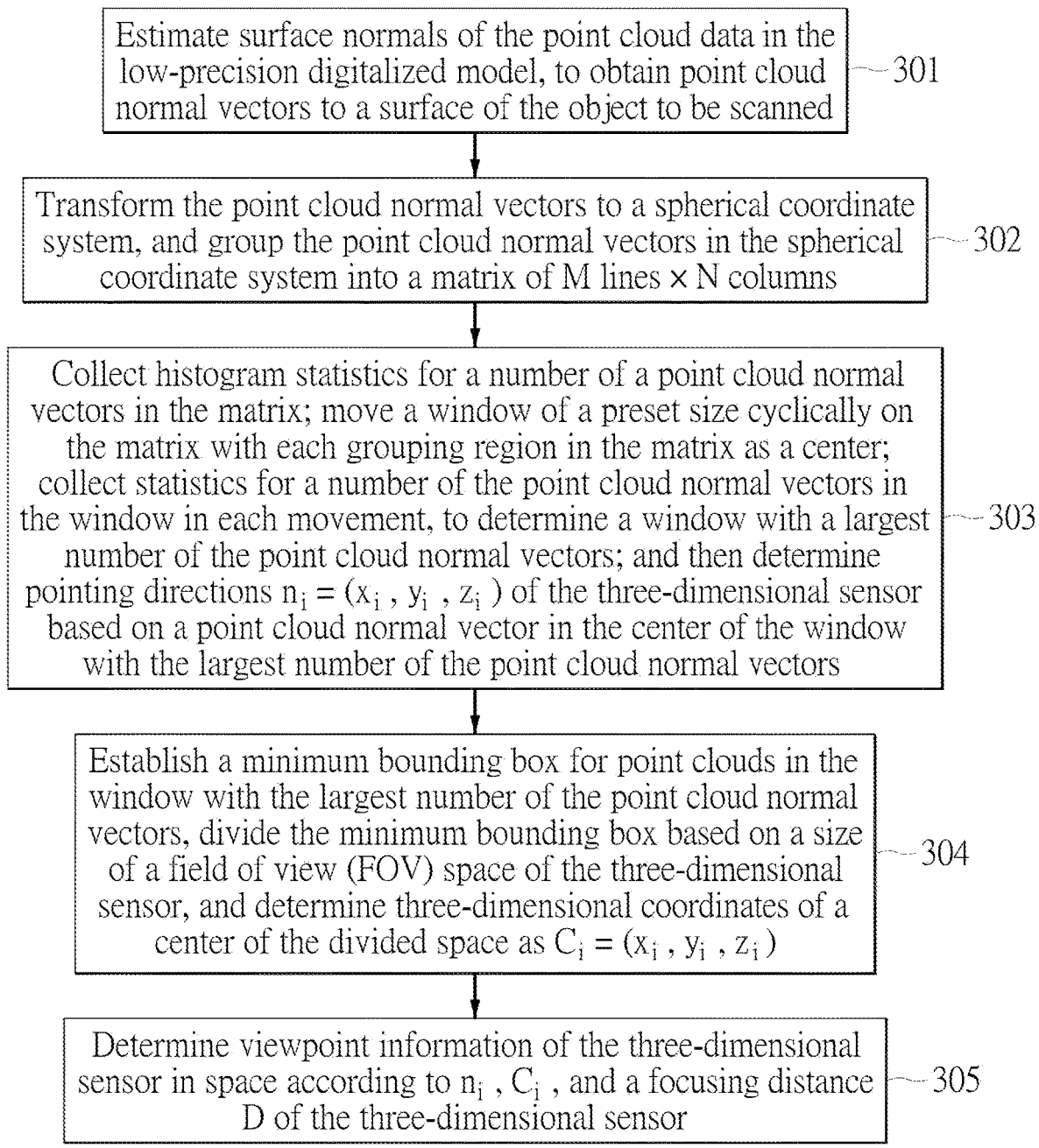
FIG. 3 is a schematic diagram of a basic process of a viewpoint planning algorithm provided in the first embodiment of the present disclosure.

In an alternative implementation of this embodiment, as shown in FIG. 3, the viewpoint planning algorithm in this embodiment specifically includes the following steps:

Step 301: Estimate surface normals of the point cloud data in the low-precision digitalized model, to obtain point cloud normal vectors to a surface of the object to be scanned.

Figure 4:
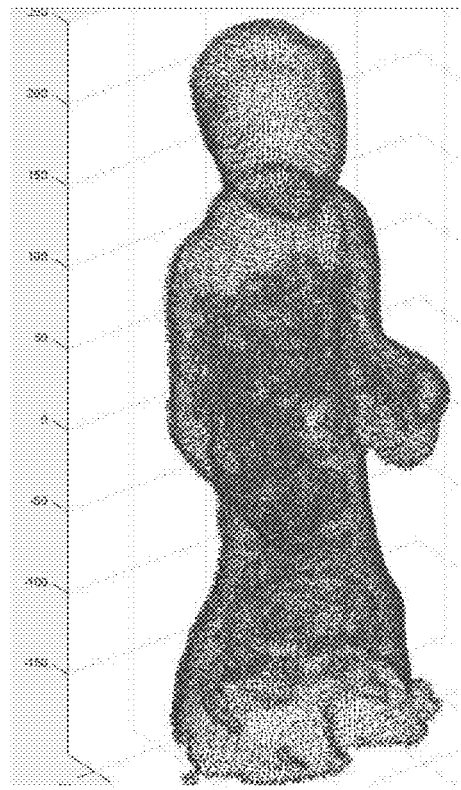
FIG. 4 is a schematic diagram of point cloud normal vectors on an object surface provided in the first embodiment of the present disclosure.

In this embodiment, based on the acquired low-precision digitalized model, point cloud surface normals are estimated by using a PCL point cloud library, to obtain normal vectors to the surface of the object, as shown in FIG. 4. Then the estimated point cloud normal vectors are stored.

Step 302: Transform the point cloud normal vectors to a spherical coordinate system, and group the point cloud normal vectors in the spherical coordinate system into a matrix of M lines×N columns.

Figure 5:
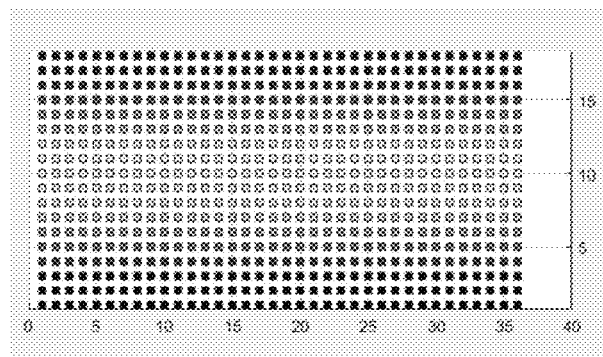
FIG. 5 is a schematic diagram of grouping into a matrix provided in the first embodiment of the present disclosure.

In this embodiment, the point cloud normal vectors $\vec{n}=(x, y, z)$ are transformed to a coordinate system, and three components of the normal vector are indicated by an azimuth angle of $\theta$, a pitch angle of $\varphi$, and a radial distance of r in the spherical coordinate system. In an actual application, the radial distance may be preferably set to 1. It should be noted that, during grouping into a matrix in this embodiment, the numbers of lines and columns of the matrix may be determined by taking every n degrees of the azimuth angle and the pitch angle as a group, that is, M is 360/n and N is 180/n. For example, grouping is carried out by taking every 10 degrees of the azimuth angle as a group and every 10 degrees of the pitch angle as a group, to group the point cloud normals into a matrix of 36×18. As shown in FIG. 5, FIG. 5 is a schematic diagram of grouping into a matrix provided in this embodiment.

Step 303: Collect histogram statistics for a number of the point cloud normal vectors in the matrix; move a window of a preset size cyclically on the matrix with each grouping region in the matrix as a center; collect statistics for a number of the point cloud normal vectors in the window in each movement, to determine a window with a largest number of the point cloud normal vectors; and then determine pointing directions $n_i=(x_i, y_i, z_i)$ of the three-dimensional sensor based on a point cloud normal vector in the center of the window with the largest number of the point cloud normal vectors.

Figure 6:
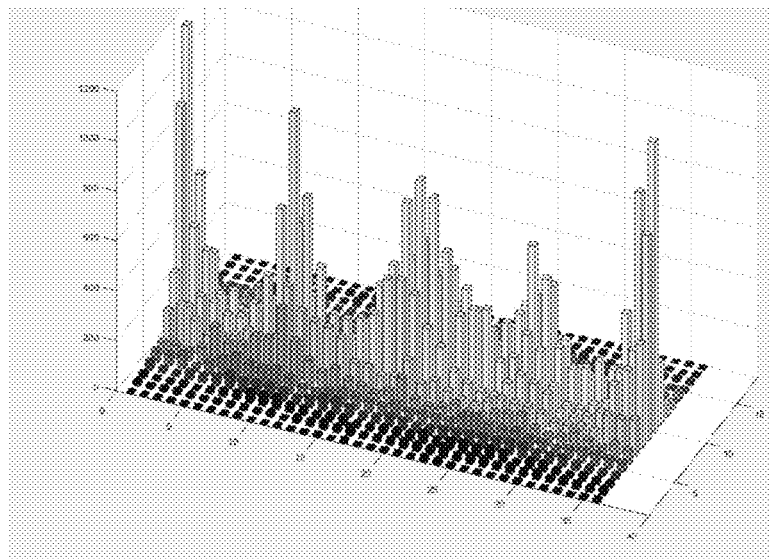
FIG. 6 is a histogram of the number of the point cloud normal vectors provided in the first embodiment of the present disclosure.

Specifically, in this embodiment, histogram statistics are collected for the number of the point cloud normal vectors in each grouping region falling within the matrix, and corresponding point cloud information is stored. As shown in FIG. 6, FIG. 6 is a histogram of the number of the point cloud normal vectors provided in this embodiment. In addition, the point cloud normal vector in the spherical coordinate system that is corresponding to the window center is transformed to a rectangular coordinate system, to obtain the pointing directions of the three-dimensional sensor.

In an alternative implementation of this embodiment, a size of the window is determined based on a field of view (FOV) angle of the three-dimensional sensor and a visibility constraint, where the visibility constraint is that a product of the point cloud normal vector and a viewpoint direction of the three-dimensional sensor is less than zero. It should be particularly noted that, an equivalent FOV angle in this embodiment is set to 28°. To meet the visibility constraint, a direction of the point cloud normal vector may be theoretically selected not to exceed 76°. In order to reduce the error, the direction of the point cloud normal vector does not exceed 45° in an instance of the present disclosure, and then a corresponding window has a size of 9×9.

After the size of the window is determined, the window is moved sequentially, and statistics for the number of the point cloud normal vectors in the window in each movement are collected, to find out a window with the largest number with the directions of a particular normal vector as the center; and then point cloud information in the window and the directions of the normal vector in the center of the window are recorded and stored.

It should be particularly noted that, in the spherical coordinate system, the azimuth angle ranges from 0° to 360° and the pitch angle ranges from 0° to 180°. When the window is moved cyclically by taking each matrix value as the center, the matrix needs to be expanded if the size of the window exceeds the value range, to expand the matrix to 44×26 in size. If the center falls at a position of (10°, 10°), a value range for the lines of the matrix is (330°~360°, 10°~50°), and a value range for the columns is (30°~0°, 10°~50°).

Step 304: Establish a minimum bounding box for point clouds in the window with the largest number of the point cloud normal vectors, divide the minimum bounding box based on a size of a field of view (FOV) space of the three-dimensional sensor, and determine three-dimensional coordinates of a center of the divided space as $C_i=(x_i, y_i, z_i)$.

Figure 7:
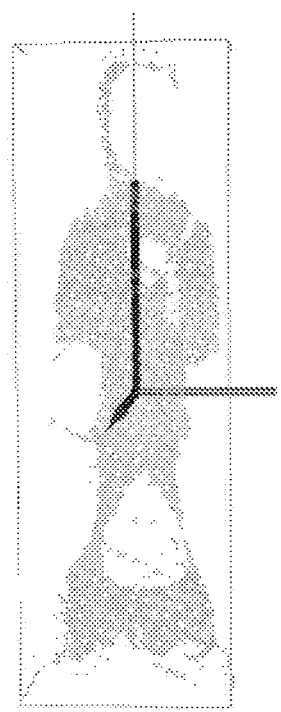
FIG. 7 is a schematic diagram showing division of a minimum bounding box provided in the first embodiment of the present disclosure.

In this embodiment, according to system parameters, the size of the FOV space, namely, the view frustum, corresponding to the three-dimensional sensor is estimated; and the established minimum bounding box is divided to realize coverage of the point cloud space in the window. As shown in FIG. 7, FIG. 7 is a schematic diagram showing division of the minimum bounding box provided in this embodiment. The coordinates of a central position in the view frustum obtained by division each time are recorded and stored.

In an alternative implementation of this embodiment, the minimum bounding box is established based on the Oriented Bounding Box (OBB) concept. That is, feature vectors of the point clouds in the window with the largest number of the point cloud normal vectors are acquired by means of Principal Component Analysis (PCA), and coordinate axes are re-defined based on the acquired feature vectors. In the re-defined coordinate axes, a centroid of the point clouds in the window with the largest number of the point cloud normal vectors is determined, and the minimum bounding box for the point clouds in the window with the largest number of the point cloud normal vectors is established based on the re-defined coordinate axes and the centroid.

Figure 8:
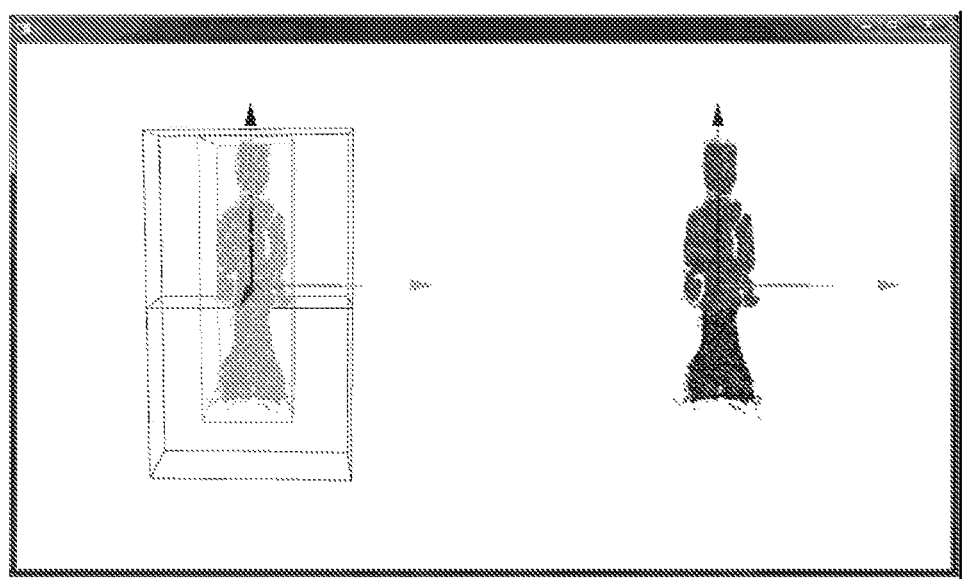
FIG. 8 is a schematic diagram showing establishment of a minimum bounding box provided in the first embodiment of the present disclosure.

Specifically, in this embodiment, the coordinate axes are re-defined for the discrete point clouds contained in the window. By using the PCL point cloud library, feature vectors, namely, the three principal axes of the OBB or three main directions of the point clouds, are acquired by means of PCA analysis. In the PCA analysis, first, a covariance matrix is obtained by using a covariance calculation formula, and then feature values and feature vectors of the covariance matrix are calculated, where feature vectors corresponding to the greatest feature value are directions of the three principal axes of the OBB. After the coordinate axes are re-defined, the centroid of the point clouds in the current coordinate axes can be determined. By using the acquired principal directions and centroid, the input point clouds are transformed to the original points, and the principal directions revert to the directions of the coordinate system, to establish a bounding box for the point clouds transformed to the original points, thus finally establishing the minimum bounding box. As shown in FIG. 8, FIG. 8 is a schematic diagram showing establishment of the minimum bounding box provided in this embodiment.

Step 305: Determine viewpoint information of the three-dimensional sensor in space according to $n_i$, $C_i$, and a focusing distance D of the three-dimensional sensor.

Specifically, in this embodiment, based on the above-calculated pointing directions of the three-dimensional sensor, three-dimensional coordinates of a point on the object pointed by the three-dimensional sensor, and the focusing distance D of the three-dimensional sensor, spatial three-dimensional coordinates, namely, a viewpoint position, of the three-dimensional sensor when scanning a specific region on the object is calculated by means of coordinate back-calculation. A connecting line between the three-dimensional coordinates of the point on the object and the calculated three-dimensional coordinates of the three-dimensional sensor is a viewpoint direction. Viewpoint position information and viewpoint direction information together form viewpoint information.

Step 103: If it is determined that a preset algorithm termination condition is met, determine all calculated viewpoint information as a target viewpoint set of a three-dimensional sensor during overall scanning of the object to be scanned, where the viewpoint information includes viewpoint position information and viewpoint direction information.

Specifically, in an actual application, to implement three-dimensional scanning of the object by the three-dimensional sensor, it is required to control the three-dimensional sensor to perform scanning at multiple different viewpoints before acquiring all three-dimensional information of the object. In this embodiment, the target viewpoint set includes information about multiple viewpoints required by the three-dimensional sensor for implementing overall scanning of the object. An algorithm termination condition is preset in this embodiment. When the algorithm termination condition is not met, the viewpoint planning algorithm of this embodiment is continuously executed; while the algorithm termination condition is met, the algorithm operation is stopped. After the target viewpoint set is determined, this set is introduced into a mobile control system carrying the three-dimensional sensor, and the system controls movement of the three-dimensional sensor according to the viewpoints calculated by using the algorithm, to realize automatic three-dimensional scanning of the object, thus avoiding cumbersome manual operations, reducing redundancy of measurement data, and greatly improving the efficiency of the system.

In an alternative implementation of this embodiment, the algorithm termination condition is relevant to a number $N_{present}$ of point clouds to be calculated currently, where $N_{present}$ denotes a number of point clouds to be calculated that are determined from point clouds remaining after the previously calculated point clouds are deleted.

Specifically, after completion of calculation for the determined point clouds, the calculated point clouds are deleted. In this embodiment, it is determined, according to the number of point clouds which are about to be calculated, whether the algorithm termination condition is met. In an extreme case of this embodiment, the algorithm termination condition may be that calculation for all point cloud data in the low-precision digitalized model is completed. Generally, the remaining point clouds are getting less and less and become increasingly sparse as execution of the algorithm continues, and it is less meaningful and necessary to continuously execute the algorithm Based on this, definitely, in order to improve the calculation efficiency of this embodiment, the algorithm may be terminated when there is still some remaining point cloud data in this embodiment.

Further, in an alternative implementation of this embodiment, the determining, based on a number $N_{present}$ of point clouds to be calculated currently, that the preset algorithm termination condition is met includes: determining a point cloud ratio $p=N_{present}/N_{total}$ according to the number $N_{present}$ of the point clouds to be calculated currently and an initial number $N_{total}$ of point clouds; and if p is less than a preset ratio threshold, determining that the preset algorithm termination condition is met.

Specifically, in this embodiment, when the ratio of the number of the point clouds to be calculated currently to the initial number is less than a preset value (for example, 1%), it is determined that there are few and sparse point clouds at present, and then the algorithm is terminated. Definitely, in some other embodiments, it may be determined, merely based on $N_{present}$, whether to terminate the algorithm. For example, it may be determined whether $N_{present}$ is less than 100, and if yes, the algorithm is terminated.

According to the method for planning three-dimensional scanning viewpoint provided by the embodiment of the present disclosure, after a low-precision digitalized model of an object to be scanned is acquired, viewpoint planning calculation is performed, on the basis of a viewpoint planning algorithm, on point cloud data in the low-precision digitalized model, and then the positions and line-of-sight directions of a plurality of viewpoints in space are calculated when a three-dimensional sensor needs to perform three-dimensional scanning on the object. Calculating viewpoints of the three-dimensional sensor by means of a viewpoint planning algorithm can effectively improve the accuracy and scientific nature of sensor posture determination, greatly improving the efficiency of viewpoint planning, and reducing the time consumed in the whole three-dimensional measurement process.

Second Embodiment

Figure 9:
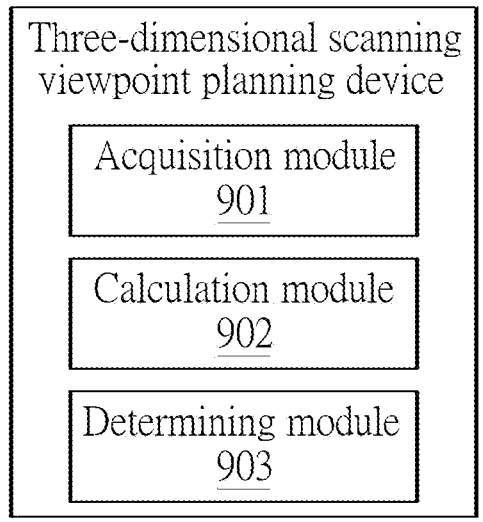
FIG. 9 is a schematic structural diagram of a device for planning three-dimensional scanning viewpoint provided in the second embodiment of the present disclosure.

Specifically referring to FIG. 9, this embodiment provides a device for planning three-dimensional scanning viewpoint, so as to solve the technical problem that manual adjustment of the camera position and posture leads to low measurement accuracy and a time-consuming measurement process during three-dimensional scanning of an object in the prior art. The device for planning three-dimensional scanning viewpoint of this embodiment includes:

an acquisition module 901, configured to acquire a low-precision digitalized model of an object to be scanned, where the low-precision digitalized model is used to indicate spatial information of the object to be scanned;

a calculation module 902, configured to perform a viewpoint planning calculation on point cloud data in the low-precision digitalized model according to a preset viewpoint planning algorithm; and a determining module 903, configured to: if it is determined that a preset algorithm termination condition is met, determine all calculated viewpoint information as a target viewpoint set of a three-dimensional sensor during overall scanning of the object to be scanned, where the viewpoint information includes viewpoint position information and viewpoint direction information.

Specifically, when the object to be scanned is an unknown object, the acquisition module 901 can use a depth camera to scan the object, thus obtaining its low-precision digitalized model. In this embodiment, the viewpoint planning algorithm is executed for the point cloud data to calculate the position and posture of the three-dimensional sensor in space during three-dimensional scanning of the object. In addition, in an actual application, to implement three-dimensional scanning of the object by the three-dimensional sensor, it is required to control the three-dimensional sensor to perform scanning at multiple different viewpoints before acquiring all three-dimensional information of the object. In this embodiment, the target viewpoint set includes information about multiple viewpoints required by the three-dimensional sensor for implementing overall scanning of the object.

In some implementations of this embodiment, the device for planning three-dimensional scanning viewpoint further includes: a processing module, configured to perform edge trimming on the low-precision digitalized model. Optionally, the edge trimming includes: edge repair and stray edge removal, where the edge repair is mending the edge. Correspondingly, the calculation module 902 is specifically configured to perform a viewpoint planning calculation on the point cloud data in the low-precision digitalized model which has been subjected to edge trimming according to the preset viewpoint planning algorithm.

In some implementations of this embodiment, the calculation module 902 is specifically configured to: estimate surface normals of the point cloud data in the low-precision digitalized model, to obtain point cloud normal vectors to a surface of the object to be scanned; transform the point cloud normal vectors to a spherical coordinate system, and group the point cloud normal vectors in the spherical coordinate system into a matrix of M lines×N columns; collect histogram statistics for a number of the point cloud normal vectors in each grouping region in the matrix, move a window of a preset size cyclically on the matrix with each grouping region as a center, collect statistics for the number of the point cloud normal vectors in the window in each movement, to determine a window with a largest number of the point cloud normal vectors, and then determine pointing directions $n_i=(x_i, y_i, z_i)$ of the three-dimensional sensor based on a point cloud normal vector in the center of the window with the largest number of the point cloud normal vectors; establish a minimum bounding box for point clouds in the window with the largest number of the point cloud normal vectors, divide the minimum bounding box based on a size of a field of view (FOV) space of the three-dimensional sensor, and determine three-dimensional coordinates of a center of the divided space as $C_i=(x_i, y_i, z_i)$; and determine viewpoint information of the three-dimensional sensor in space according to $n_i$, $C_i$, and a focusing distance D of the three-dimensional sensor.

Further, in some implementations of this embodiment, a size of the window is determined based on a field of view (FOV) angle of the three-dimensional sensor and a visibility constraint, where the visibility constraint is that a product of the point cloud normal vector and a viewpoint direction of the three-dimensional sensor is less than zero.

Further, in some implementations of this embodiment, the calculation module 902 is specifically configured to: acquire feature vectors of the point clouds in the window with the largest number of the point cloud normal vectors by means of PCA analysis, and re-define coordinate axes based on the acquired feature vectors; determine a centroid of the point clouds in the window with the largest number of the point cloud normal vectors in the re-defined coordinate axes, and establish the minimum bounding box for the point clouds in the window with the largest number of the point cloud normal vectors according to the re-defined coordinate axes and the centroid.

In some implementations of this embodiment, the determining module 903 is specifically configured to: if it is determined, based on the number $N_{present}$ of the point clouds to be calculated currently, that a preset algorithm termination condition is met, determine all calculated viewpoint information as a target viewpoint set of a three-dimensional sensor during overall scanning of the object to be scanned, where $N_{present}$ denotes a number of point clouds to be calculated that are determined from point clouds remaining after the previously calculated point clouds are deleted.

Further, in some implementations of this embodiment, the determining module 903 is specifically configured to determine a point cloud ratio $p=N_{present}/N_{total}$ according to the number $N_{present}$ of the point clouds to be calculated currently and an initial number $N_{total}$ of point clouds; and if p is less than a preset ratio threshold, determine that the preset algorithm termination condition is met.

By using the device for planning three-dimensional scanning viewpoint provided by this embodiment, after a low-precision digitalized model of an object to be scanned is acquired, viewpoint planning calculation is performed, on the basis of a viewpoint planning algorithm, on point cloud data in the low-precision digitalized model, and then the positions and line-of-sight directions of a plurality of viewpoints in space are calculated when a three-dimensional sensor needs to perform three-dimensional scanning on the object. Calculating viewpoints of the three-dimensional sensor by means of a viewpoint planning algorithm can effectively improve the accuracy and scientific nature of sensor posture determination, greatly improving the efficiency of viewpoint planning, and reducing the time consumed in the whole three-dimensional measurement process.

Third Embodiment

Figure 10:
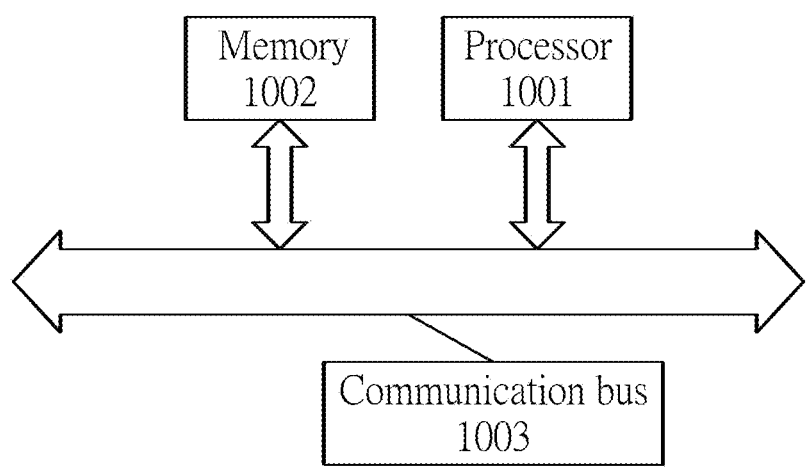
FIG. 10 is a schematic structural diagram of an electronic device provided in the third embodiment of the present disclosure.

This embodiment provides an electronic device, which, as shown in FIG. 10, includes a processor 1001, a memory 1002, and a communication bus 1003. The communication bus 1003 is configured to realize connection and communication between the processor 1001 and the memory 1002; and the processor 1001 is configured to execute one or more computer programs stored in the memory 1002, so as to implement at least one step of the foregoing method for planning three-dimensional scanning viewpoint in the first embodiment.

This embodiment further provides a computer readable storage medium, which includes a volatile or nonvolatile, removable or non-removable medium implemented in any method or technology for storing information (such as computer readable instructions, data structures, computer program modules, or other data). The computer readable storage medium includes, but is not limited to, a Random Access Memory (RAM), a Read-Only Memory (ROM), an Electrically Erasable Programmable Read-Only Memory (EEPROM), a flash memory or other memory technologies, a Compact Disc Read-Only Memory (CD-ROM), a Digital Versatile Disc (DVD) or other optical disk storages, magnetic cassettes, magnetic tapes, magnetic disk storages or other magnetic storage devices, or any other medium that can be used to store desired information and can be accessed by a computer.

The computer readable storage medium in this embodiment can be used to store one or more computer programs, and the one or more computer programs stored therein can be executed by the processor to implement at least one step of the foregoing method in the first embodiment.

This embodiment further provides a computer program which can be distributed on a computer readable medium and executed by a computing device, so as to implement at least one step of the foregoing method in the first embodiment. In addition, in some cases, at least one of the shown or described steps can be performed in a different order from that described in the foregoing embodiment.

This embodiment also provides a computer program product which includes a computer readable device, and the computer readable device stores the computer program shown above. The computer readable device in this embodiment may include the computer readable storage medium shown above.

It can be seen that, those skilled in the art should understand that all or some of the steps in the method disclosed above, and the functional modules/units in the system and the device can be implemented as software (which can be implemented by computer program code executable by the computing device), firmware, hardware, or their appropriate combination. In the hardware implementation, the classification between the functional modules/units mentioned in the above description does not necessarily correspond to the classification of physical components. For example, a physical component can have multiple functions, or a function or step can be performed by several physical components in cooperation. Some or all of the physical components can be implemented as software executed by a processor, such as a central processing unit, a digital signal processor, or a microprocessor; or as hardware; or as an integrated circuit, such as an application-specific integrated circuit.

In addition, as is well known to those of ordinary skill in the art, a communication medium usually contains computer readable instructions, data structures, computer program modules, or other data in a modulated data signal such as carrier waves or other transmission mechanisms; and may include any information delivery medium. Therefore, the present disclosure is not limited to any specific combination of hardware and software.

The above further describes in detail the embodiments of the present disclosure with reference to specific implementations, and it cannot be considered that the specific implementations of the present disclosure are limited to these descriptions. For those of ordinary skill in the technical field to which the present disclosure belongs, several simple deductions or substitutions can be made without departing from the concept of the present disclosure, which should all be regarded as falling within the protection scope of the present disclosure.

What is claimed is:

1. A method for planning three-dimensional scanning viewpoint, comprising:

acquiring a low-precision digitalized model of an object to be scanned, wherein the low-precision digitalized model is used to indicate spatial information of the object to be scanned;

performing a viewpoint planning calculation on point cloud data in the low-precision digitalized model according to a preset viewpoint planning algorithm; and if it is determined that a preset algorithm termination condition is met, determining all calculated viewpoint information as a target viewpoint set of a three-dimensional sensor during overall scanning of the object to be scanned, wherein the viewpoint information comprises viewpoint position information and viewpoint direction information;

wherein the performing the viewpoint planning calculation on point cloud data in the low-precision digitalized model comprises:

estimating surface normals of the point cloud data in the low-precision digitalized model, to obtain point cloud normal vectors to a surface of the object to be scanned;

transforming the point cloud normal vectors to a spherical coordinate system, and grouping the point cloud normal vectors in the spherical coordinate system into a matrix of M lines×N columns;

collecting histogram statistics for a number of the point cloud normal vectors in each grouping region in the matrix; moving a window of a preset size cyclically on the matrix with each grouping region as a center; collecting statistics for a number of the point cloud normal vectors in the window in each movement, to determine a window with a largest number of the point cloud normal vectors; and then determining pointing directions ni=(xi, yi, zi) of the three-dimensional sensor based on a point cloud normal vector in the center of the window with the largest number of the point cloud normal vectors;

establishing a minimum bounding box for point clouds in the window with the largest number of the point cloud normal vectors, dividing the minimum bounding box based on a size of a field of view (FOV) space of the three-dimensional sensor, and determining three-dimensional coordinates of a center of the divided space as Ci=(xi, yi, zi), and determining viewpoint information of the three-dimensional sensor in space according to ni, Ci, and a focusing distance D of the three-dimensional sensor.

2. The method for planning three-dimensional scanning viewpoint according to claim 1, wherein before the performing the viewpoint planning calculation on point cloud data in the low-precision digitalized model according to the preset viewpoint planning algorithm, the method further comprises:

performing edge trimming on the low-precision digitalized model, and wherein the performing the viewpoint planning calculation on point cloud data in the low-precision digitalized model according to the preset viewpoint planning algorithm comprises:

performing the viewpoint planning calculation on the point cloud data in the low-precision digitalized model, which has been subjected to edge trimming, according to the preset viewpoint planning algorithm.

3. The method for planning three-dimensional scanning viewpoint according to claim 2, wherein a size of the window is determined based on a field of view (FOV) angle of the three-dimensional sensor and a visibility constraint, and the visibility constraint is that a product of the point cloud normal vector and a viewpoint direction of the three-dimensional sensor is less than zero.

4. The method for planning three-dimensional scanning viewpoint according to claim 2, wherein the establishing the minimum bounding box for the point clouds in the window with the largest number of the point cloud normal vectors comprises:

acquiring feature vectors of the point clouds in the window with the largest number of the point cloud normal vectors by means of Principal Component Analysis (PCA), and re-defining coordinate axes based on the acquired feature vectors; and determining a centroid of the point clouds in the window with the largest number of the point cloud normal vectors in the re-defined coordinate axes, and establishing the minimum bounding box for the point clouds in the window with the largest number of the point cloud normal vectors according to the re-defined coordinate axes and the centroid.

5. The method for planning three-dimensional scanning viewpoint according to claim 1, wherein the determining that the preset algorithm termination condition is met comprises:

determining, based on a number Npresent of point clouds to be calculated currently, that the preset algorithm termination condition is met, wherein Npresent denotes a number of point clouds to be calculated that are determined from point clouds remaining after the previously calculated point clouds are deleted.

6. The method for planning three-dimensional scanning viewpoint according to claim 5, wherein the determining, based on the number Npresent of point clouds to be calculated currently, that the preset algorithm termination condition is met comprises:

determining a point cloud ratio p=Npresent/Ntotal according to the number Npresent of the point clouds to be calculated currently and an initial number Ntotal of point clouds; and if p is less than a preset ratio threshold, determining that the preset algorithm termination condition is met.

7. The method for planning three-dimensional scanning viewpoint according to claim 6, wherein a size of the window is determined based on a field of view (FOV) angle of the three-dimensional sensor and a visibility constraint, and the visibility constraint is that a product of the point cloud normal vector and a viewpoint direction of the three-dimensional sensor is less than zero.

8. The method for planning three-dimensional scanning viewpoint according to claim 6, wherein the establishing the minimum bounding box for the point clouds in the window with the largest number of the point cloud normal vectors comprises:
  acquiring feature vectors of the point clouds in the window with the largest number of the point cloud normal vectors by means of Principal Component Analysis (PCA), and re-defining coordinate axes based on the acquired feature vectors; and
  determining a centroid of the point clouds in the window with the largest number of the point cloud normal vectors in the re-defined coordinate axes, and establishing the minimum bounding box for the point clouds in the window with the largest number of the point cloud normal vectors according to the re-defined coordinate axes and the centroid.

9. The method for planning three-dimensional scanning viewpoint according to claim 5, wherein a size of the window is determined based on a field of view (FOV) angle of the three-dimensional sensor and a visibility constraint, and the visibility constraint is that a product of the point cloud normal vector and a viewpoint direction of the three-dimensional sensor is less than zero.

10. The method for planning three-dimensional scanning viewpoint according to claim 5, wherein the establishing the minimum bounding box for the point clouds in the window with the largest number of the point cloud normal vectors comprises:
  acquiring feature vectors of the point clouds in the window with the largest number of the point cloud normal vectors by means of Principal Component Analysis (PCA), and re-defining coordinate axes based on the acquired feature vectors; and
  determining a centroid of the point clouds in the window with the largest number of the point cloud normal vectors in the re-defined coordinate axes, and establishing the minimum bounding box for the point clouds in the window with the largest number of the point cloud normal vectors according to the re-defined coordinate axes and the centroid.

11. The method for planning three-dimensional scanning viewpoint according to claim 1, wherein a size of the window is determined based on a field of view (FOV) angle of the three-dimensional sensor and a visibility constraint, and the visibility constraint is that a product of the point cloud normal vector and a viewpoint direction of the three-dimensional sensor is less than zero.

12. The method for planning three-dimensional scanning viewpoint according to claim 1, wherein the establishing the minimum bounding box for the point clouds in the window with the largest number of the point cloud normal vectors comprises:
  acquiring feature vectors of the point clouds in the window with the largest number of the point cloud normal vectors by means of Principal Component Analysis (PCA), and re-defining coordinate axes based on the acquired feature vectors; and
  determining a centroid of the point clouds in the window with the largest number of the point cloud normal vectors in the re-defined coordinate axes, and establishing the minimum bounding box for the point clouds in the window with the largest number of the point cloud normal vectors according to the re-defined coordinate axes and the centroid.

13. A device for planning three-dimensional scanning viewpoint, comprising:
  an acquisition module configured to acquire a low-precision digitalized model of an object to be scanned, wherein the low-precision digitalized model is used to indicate spatial information of the object to be scanned;
  a calculation module configured to perform a viewpoint planning calculation on point cloud data in the low-precision digitalized model according to a preset viewpoint planning algorithm, wherein performing the viewpoint planning calculation on point cloud data in the low-precision digitalized model comprises:
    estimating surface normals of the point cloud data in the low-precision digitalized model, to obtain point cloud normal vectors to a surface of the object to be scanned;
    transforming the point cloud normal vectors to a spherical coordinate system, and grouping the point cloud normal vectors in the spherical coordinate system into a matrix of M lines×N columns;
    collecting histogram statistics for a number of the point cloud normal vectors in each grouping region in the matrix; moving a window of a preset size cyclically on the matrix with each grouping region as a center; collecting statistics for a number of the point cloud normal vectors in the window in each movement, to determine a window with a largest number of the point cloud normal vectors; and then determining pointing directions ni=(xi, yi, zi) of the three-dimensional sensor based on a point cloud normal vector in the center of the window with the largest number of the point cloud normal vectors;
    establishing a minimum bounding box for point clouds in the window with the largest number of the point cloud normal vectors, dividing the minimum bounding box based on a size of a field of view (FOV) space of the three-dimensional sensor, and determining three-dimensional coordinates of a center of the divided space as Ci=(xi, yi, zi); and
    determining viewpoint information of the three-dimensional sensor in space according to ni, Ci, and a focusing distance D of the three-dimensional sensor; and
  a determining module configured to: if it is determined that a preset algorithm termination condition is met, determine all calculated viewpoint information as a target viewpoint set of a three-dimensional sensor during overall scanning of the object to be scanned, wherein the viewpoint information comprises viewpoint position information and viewpoint direction information.

14. An electronic device, comprising a processor, a memory and a communication bus, wherein:
  the communication bus is configured to realize connection and communication between the processor and the memory; and
  the processor is configured to execute one or more programs stored in the memory, so as to implement the steps of the method for planning three-dimensional scanning viewpoint according to claim 1.

15. A computer readable storage medium, which stores one or more programs, wherein the one or more programs are able to be executed by one or more processors, so as to implement the steps of the method for planning three-dimensional scanning viewpoint according to claim 1.

* * * * *